L. W. CHUBB.
CONVERTING SYSTEM.
APPLICATION FILED MAY 7, 1917.

1,357,223.

Patented Nov. 2, 1920.

WITNESSES:
Fred. A. Lind.
D. C. Davis.

INVENTOR
Lewis W. Chubb
BY
Eberley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONVERTING SYSTEM.

1,357,223.  Specification of Letters Patent.  Patented Nov. 2, 1920.

Application filed May 7, 1917. Serial No. 167,089.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Converting Systems, of which the following is a specification.

My invention relates to electrical converting systems of the type employed for converting alternating current into direct current, and it has for its object to provide a system of the character designated that shall be simple and effective in operation, particularly in the continued and economical use of the various elements of which it is constituted.

Figure 2:
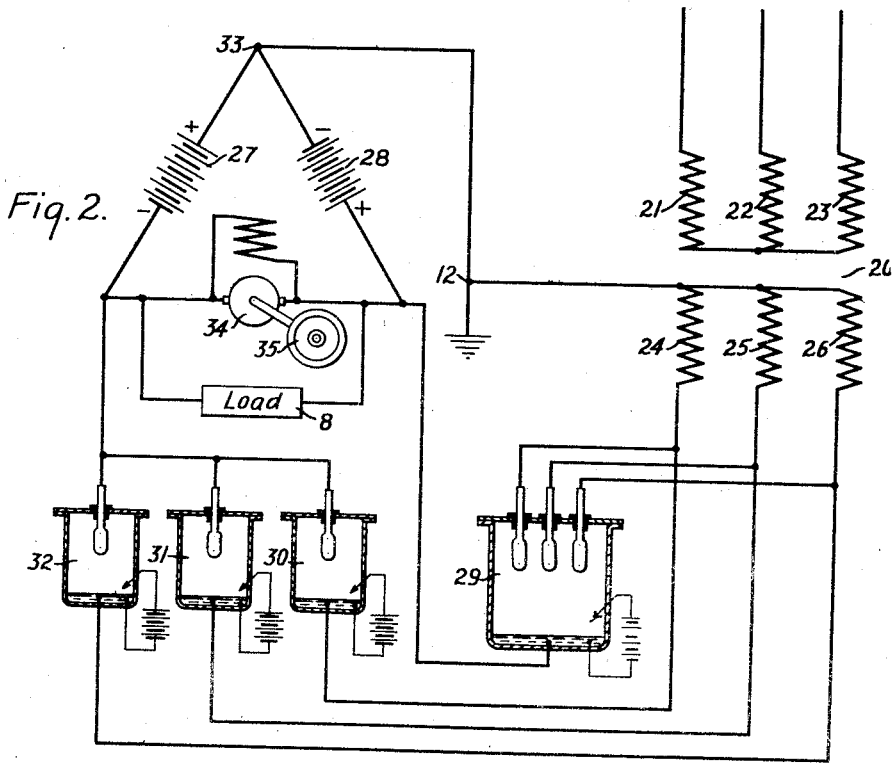
Figure 1:
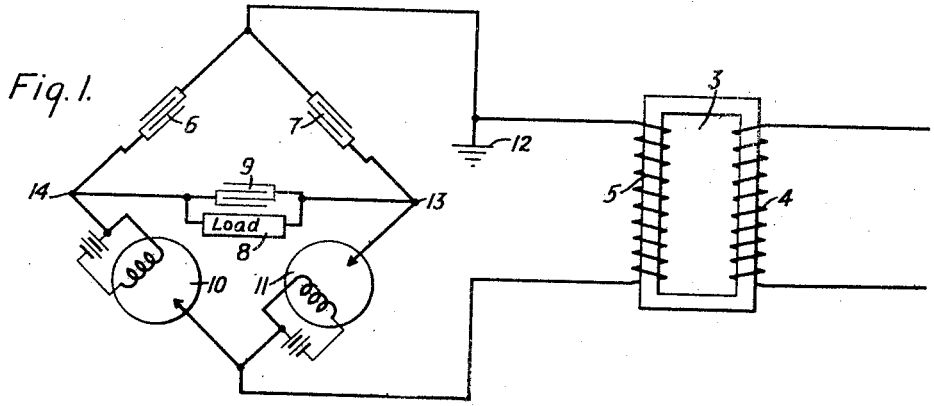

In the accompanying drawing, Figure 1 is a simplified diagrammatic view of a system embodying one form of my invention and Fig. 2 is a similar view of a modification of the system shown in Fig. 1.

In the conversion or rectification of alternating current into direct current, it is a common practice to employ a two-anode rectifying aggregate, connecting one anode to each terminal of the alternating-current source and connecting the cathode to substantially the mid point of the alternating-current source. By this means, both half waves are caused to flow to the direct-current load but the two halves of the alternating current source are alternately active, resulting in the uneconomical use of the supply transformer. Furthermore, the theoretical maximum value of the rectified voltage is but one-half the maximum value of the alternating-current supply.

Another system employs the well known "Leo Graetz" connection, wherein a Wheatstone bridge is formed with a rectifying unit in each side thereof, the alternating-current source being connected across one diagonal of the bridge and the direct-current load being connected across the remaining diagonal. A system of this type is shown in the patent to Pollak, No. 672,913. Systems of this character employ the entire transformer winding during each half cycle but two of the rectifying units are inactive during each half cycle, resulting in an uneconomical use of the rectifying units. The maximum theoretical voltage which may be applied to the load cannot exceed the maximum voltage of the alternating-current supply.

In accordance with my invention, I provide a rectifying system in which the entire transformer supply winding is employed during each half cycle and wherein the maximum voltage which may be applied to the load is substantially twice the maximum or crest voltage of the alternating-current supply. Briefly speaking, this result is attained by employing auxiliary condensers, storage batteries or other forms of energy-storing apparatus, charging said apparatus to the voltage of the supply during one-half cycle and discharging said apparatus through the load in series with the supply during the succeeding half cycle, whereby substantially twice the voltage of the supply is imposed upon the load during each half cycle.

Referring to the accompanying drawing for a more detailed understanding of my invention, I show an alternating current source, such, for example, as a supply transformer at 3 in Fig. 1, said transformer comprising a primary winding 4 and a secondary winding 5. One terminal of the winding 5 is connected to the upper electrodes of each of a pair of condensers 6 and 7. The lower electrodes of said condensers are connected to the opposite terminals of a load represented at 8, said load being shunted by a condenser 9 or other energy storing and restoring device. The cathode of a hot cathode converting unit 10 is connected to a point 14 intermediate the condenser 6 and the load 8 and the anode of a similar converting unit 11 is connected to a point 13 intermediate the condenser 7 and the load 8. The anode of the converting unit 10 and the cathode of the converting unit 11 are joined together and connected to the lower terminal of the supply winding 5.

Having thus described the arrangement of a system embodying my invention, the operation is as follows. For the purpose of illustration, let it be assumed that a point intermediate the condensers 6 and 7 and the upper terminal of the winding 5 be grounded, as shown at 12. The point 12 always remains at ground potential, therefore, and may be considered as having zero or datum potential. Assume that the maxi- mum voltage of a half cycle is 100 volts and in such direction that the lower terminal of the winding 5 assumes the potential −100. Neglecting the drop in the converter 11, the point 13 intermediate the condenser 7 and the load 8 also assumes a potential −100. No potential is transferred through the rectifying device 10 because of the asymmetric conductivity thereof. The upper electrodes of the condensers 6 and 7 are at zero potential and the lower electrode of the condenser 7 assumes a potential −100. Thus, the condenser 7 is charged to a potential of 100 volts.

During the succeeding half cycle the lower terminal of the supply winding 5 assumes a potential +100. Said potential is transferred through the converting device 10 to the point 14, between the condenser 6 and the load 8, and raises the potential of said point to +100. The condenser 7 still carries its charge received during the preceding half cycle and the effect of said charge is to maintain the point 13 at a potential of −100. Thus, there is a potential across the load 8 of 200 volts and the discharge of the condenser 7 permits the flow of the current through the load 8 at this double supply voltage. At the same time, the lower electrode of the condenser 6 assumes a potential of +100 so that in the succeeding half cycle, said condenser 6 discharges in series with a supply voltage wave transmitted through the converter 11 in such manner as to give substantially twice the supply voltage and in the same direction through the load 8.

The action thus described is continued as long as the supply winding 5 is energized, each condenser 6 and 7 absorbing a charge from alternate half cycles and partially discharging said charge in series circuit with the supply electromotive force in the succeeding half cycle. Thus the converting units 10 and 11 are alternately active and substantially twice the maximum supply voltage is applied to the load. It is obvious that the intermittent pulsations of electromotive force thus applied to the load 8 are not well adapted for many types of variable load and the function of the energy-storing device 9 is to smooth out said pulsations, in a well known manner.

The system of Fig. 1 is well adapted for the conversion of relatively small amounts of power at extremely high voltage, as employed in smoke precipitation and similar arts. In this connection, the operation of the system in producing double supply voltage is of marked advantage as it permits the production of extremely high unidirectional electromotive forces without the use of extremely high potential transformers.

For the rectification of large amounts of power at comparatively low voltage, the system may be modified as shown in Fig. 2, this figure further showing the application of my invention to polyphase supply systems.

A polyphase transformer 20, embodying primary windings 21, 22 and 23 and secondary windings 24, 25 and 26, is connected to energize a load 8 through storage batteries 27 and 28 and through converting devices 29, 30, 31 and 32 of the well known mercury vapor type. The secondary members 24, 25 and 26 are star-connected and their neutral point is connected to a junction point 33, the intermediate connection being grounded as shown at 12'. The positive pole of the battery 27 and the negative pole of the battery 28 are connected to the point 33. The negative pole of the battery 27 and the positive pole of the battery 28 are connected to the opposite terminals of the load 8. The anodes of the converting devices 30, 31 and 32 are connected to the negative pole of the battery 27 and the cathode of the converting device 29 is connected to the positive pole of the battery 28. The converting device 29 is provided with three anodes and said anodes are connected, respectively, to the lower terminals of the secondary windings 24, 25 and 26, respectively, as are also the cathodes of the devices 30, 31 and 32. An energy-storing and pulsation-eliminating device 34 is connected across the terminals of the load 8 and is shown as a dynamo-electric machine of the shunt type capable of storing considerable rotational energy, either through inherent flywheel capacity or because of an auxiliary flywheel 35.

Having thus described the arrangement of the system of Fig. 2, the operation thereof is as follows. A single-phase electromotive force, such as that of the winding 24, alternately discharges through the converters 29 and 30, alternately charging and discharging each of the batteries 27 and 28 in a manner similar to that indicated with respect to the condensers 6 and 7 of Fig. 1. Thus, assuming that the alternating current supply is connected when the wave impulse in phase winding 24 is just beginning its positive half-cycle, the battery 28 will then discharge through the load 8, one of the converting devices 31 or 32, and one of the transformer windings 25 or 26, to the neutral point 12. As the winding 25 or 26 is then supplying substantially maximum voltage on its negative half-cycle, the voltage across the load 8 is practically double the voltage of the alternating-current supply. When the electromotive force of the winding 24 increases to the electromotive force of the battery, current will flow from the winding 24 through the converting device 29, and will then divide, part charging the battery 28, and part traversing the load 8, one or both of the converting devices 31 and 32, and one or both of the transformer windings 25 and 26, to the neutral point 12. When the alternating electromotive force decreases below the electromotive force of the battery 28, the latter again discharges as at the beginning of the half-cycle.

The battery 27 discharges and charges in a similar manner during the next succeeding half-cycle of the electromotive force in phase winding 24. The phases 25 and 26 operate in an analogous manner, although with a phase displacement of 120° from each other and from the phase 24. Thus successive impulses of load current traverse alternately the path 28—8—30 and 29—8—27, from the source 24 and likewise with respect to the sources 25 and 26, the action with respect to any single source being analogous to that in the system of Fig. 1.

It will be understood that, when the capacity of the energy-storing devices, such as 27 and 28, is high, and the load 8 is relatively light, as in precipitation or X-ray work, the working circuit through the load will be practically as follows, 33—28—8—27—33. The batteries 27 and 28 will then each have a voltage substantially equal to the maximum voltage of the alternating-current voltage impulses, and these batteries will receive a very small charge at the peaks of the alternating-current voltage waves of the various phases. Under these conditions, the negative terminal of the battery 27 will have a substantially constant potential very nearly equal to —E, E being the maximum voltage of the alternating-current supply, and current cannot flow from one phase, such as 24, through the rectifier 29 and load 8, and back through one of the rectifiers 31 or 32 and windings 25 or 26 of another phase. The return circuit from the load 8 at that instant is by way of the battery 27 to the neutral point 12, the current through the rectifiers 31 or 32 being precluded by reason of the fact that the anodes, which have the potential of the battery 27, are negative to the cathodes, which have the potentials of the phase windings 25 and 26 at the time when maximum voltage exists in phase 24. The current from one phase, as 24, can return from the load 8 through one of the rectifiers 31 or 32, and winding 25 or 26 of another phase only when the direct-current load is sufficient to make the voltage of the batteries 27 and 28 fall off to a value less than 0.867 E in between the successive charging impulses of the battery 28, for example, since only then will the cathodes of either of the rectifiers 31 or 32 become at any time negative to their anodes. However, whether the direct-current load 8 is large or small, one of the elements, as 27 or 28, of the energy-storing means will receive energy at some period during each half-cycle of each phase, and the same device will also, at some period or periods during the same half-cycle, deliver energy to the direct-current load circuit.

The shunt-wound machine 34 acts alternately as a motor and as a generator during each pulsation, absorbing energy from the system and storing it in the fly-wheel 35 during energy peaks and giving up said stored energy during periods of deficiency in the energy supply, thus performing the function of the condenser 9 of Fig. 1.

I have described the use of three types of energy-storing devices, namely, condensers, storage batteries and fly-wheel dynamo-electric machines, but I desire it to be distinctly understood that the present invention is not restricted to the use of any specific form of energy storing device in any specific relation but any of the forms shown, or any of their equivalents, may be employed in any desired relation, as is demanded by the conditions of each specific installation.

While I have shown my invention in its preferred forms it will be obvious to those skilled in the art that it is susceptible of various minor changes and modifications without departing from the spirit thereof and I desire, therefore, that only such limitations shall be placed thereupon as are imposed by the prior art or as are specifically set forth in the appended claims.

I claim as my invention:

1. In a rectifying system, a four-arm bridge connection, energy-storing and restoring means in two adjacent arms of said bridge, rectifying means in each of the two remaining arms of said bridge, a source of alternating-current connected across one diagonal of said bridge, and a direct-current load circuit connected across the remaining diagonal thereof.

2. In a rectifying system, a four-arm bridge connection, energy-storing and restoring means in two adjacent arms of said bridge, asymmetric conducting means in each of the two remaining arms, a source of alternating current connected between the junction point of said two energy-storing arms and the junction point of said two asymmetric arms, and a direct-current load circuit connected across the remaining diagonal of said bridge.

3. In a rectifying system, a four-arm bridge connection, energy storing and restoring means in two adjacent arms of said bridge, rectifying means in each of the two remaining arms of said bridge, a source of alternating current connected across one diagonal of said bridge, a direct-current load circuit connected across the remaining diagonal thereof and energy-storing and restoring means connected in shunt relation to said load circuit.

4. In a rectifying system, a four-arm bridge connection, energy storing and restoring means in two adjacent arms of said bridge, asymmetric conducting means in each of the two remaining arms, a source of alternating current connected between the junction point of said two energy storing arms and the junction point of said two asymmetric arms, a direct-current load circuit connected across the remaining diagonal of said bridge, and energy storing and restoring means connected in shunt relation to said load circuit.

5. The method of rectifying alternating current which comprises imparting energy to storage means during a half cycle, discharging said storage means in series relation with the alternating current source during the next succeeding half-cycle, and further storing energy in said succeeding half-cycle to be discharged, in turn, through said alternating current source during the next succeeding half-cycle.

6. In a rectifying system, three energy receptive elements, and means whereby, during alternate half-cycles, a pair of said elements are adapted to be connected to an alternating-current source in series relation to each other and in parallel relation to the remaining element and whereby, during the remaining half-cycle, a different pair of said elements are adapted to be connected to the source in series relation to each other and in parallel relation to the remaining element.

7. In a rectifying system, a pair of energy-storing devices connected in series, with a pole of one connected to a pole of the other having opposite potential, said poles being adapted to be connected to a source of alternating-current energy, and the free poles of said energy-storing devices being adapted to be connected to a direct-current load circuit, and means adapted to be connected to said alternating-current source for alternately energizing said free poles of said energy-storing devices during successive half-cycles.

8. In a rectifying system, a pair of energy-storing devices connected in series, with a pole of one connected to a pole of the other having opposite potential, said poles being adapted to be connected to a source of alternating-current energy, and the free poles of said energy-storing devices being adapted to be connected to a direct-current load circuit, and rectifying means adapted to be connected to said alternating-current source for alternately energizing said free poles of said energy-storing devices during successive half-cycles.

9. In a rectifying system, a pair of energy-storing devices connected in series, with a pole of one connected to a pole of the other having opposite potential, said poles being adapted to be connected to a source of alternating-current energy, and the free poles of said energy-storing devices being adapted to be connected to a direct-current load circuit, and asymmetrical rectifying means adapted to be connected to said alternating-current source for alternately energizing said free poles of said energy-storing devices during successive half-cycles.

10. In a rectifying system, a pair of energy-storing devices connected in series, with a pole of one connected to a pole of the other having opposite potential, said poles being adapted to be connected to a source of polyphase alternating-current energy, and the free poles of said energy-storing devices being adapted to be connected to a direct-current load circuit, and polyphase asymmetrical rectifying means adapted to be connected to said alternating-current source for alternately energizing said free poles of said energy-storing devices during successive half-cycles, of the respective phases.

11. In a rectifying system, a pair of energy-storing devices connected in series, with a pole of one connected to a pole of the other having opposite potential, a source of star-connected polyphase alternating-current energy having its common junction-point connected to said poles, the free poles of said energy-storing devices being adapted to be connected to a direct-current load circuit, and polyphase asymmetrical rectifying means connected to the respective phases of said alternating-current source for alternately energizing said free poles of said energy-storing devices during successive half-cycles of the respective phases.

12. In a rectifying system, a four-arm bridge connection, energy-storing and restoring means in two adjacent arms of said bridge, rectifying means in each of the two remaining arms, a source of alternating current connected between the junction point of said two energy-storing arms and the junction point of said two rectifying arms, and a direct-current load circuit connected across the remaining diagonal of said bridge.

In testimony whereof, I have hereunto subscribed my name this 30th day of April, 1917.

LEWIS W. CHUBB.